United States Patent — Setia (10) Patent No.: US 12,020,244 B2
(45) Date of Patent: *Jun. 25, 2024

(54) MASKING A PRIMARY ACCOUNT NUMBER BETWEEN A PARTY AND A SERVICE PROVIDER (71) Applicant: VISA INTERNATIONAL SERVICE ASSOCIATION, San Francisco, CA (US)

(72) Inventor: Sahil Setia, Singapore (SG)

(73) Assignee: Visa International Service Association, San Francisco, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/861,709

(22) Filed: Jul. 11, 2022

(65) Prior Publication Data

US 2022/0343321 A1    Oct. 27, 2022

Related U.S. Application Data (63) Continuation of application No. 16/401,434, filed on May 2, 2019, now Pat. No. 11,429,961.

(51) Int. Cl.
G06Q 20/38    (2012.01)

(52) U.S. Cl.
CPC ....... G06Q 20/383 (2013.01); G06Q 20/3827 (2013.01)

(58) Field of Classification Search
None
See application file for complete search history.

(56) References Cited

U.S. PATENT DOCUMENTS 6,853,987 B1 * 2/2005 Cook ............... G06Q 20/383
                                                    705/72
7,677,450 B1 * 3/2010 Rajewski ........... G06Q 20/22
                                                    235/383

(Continued)

FOREIGN PATENT DOCUMENTS

WO    2018056992    3/2018
WO    2019194962    10/2019

OTHER PUBLICATIONS

Office Action (Ex Parte Quayle Action) dated Mar. 21, 2022 for U.S. Appl. No. 16/401,434 (pp. 1-7).

(Continued)

Primary Examiner — Jacob C. Coppola
(74) Attorney, Agent, or Firm — K&L Gates LLP (57) ABSTRACT A computer implemented method for masking a primary account number between a party and a service provider. A plurality of transaction records from a database is retrieved. A masking value is generated in response to having a first hash function executed on a primary account number. The receiving, at the service provider, the masking value from the client execution environment without the primary account number; wherein the server execution environment lacks identification of the affiliation between the primary account number and the party. Upon confirming that the first hash function is identical to the second hash function, matching the masking value to the second masking value. In response to a match, querying the database for transaction history associated with the masking value. An analysis report is generated.

10 Claims, 6 Drawing Sheets (56) References Cited

U.S. PATENT DOCUMENTS

| | | | | |
|---|---|---|---|---|
| 8,688,524 | B1* | 4/2014 | Ramalingam | G06Q 30/0246 |
| | | | | 705/16 |
| 8,935,797 | B1 | 1/2015 | Silver | |
| 11,429,961 | B2* | 8/2022 | Setia | G06Q 20/367 |
| 2005/0240531 | A1* | 10/2005 | Wolff | G06Q 30/06 |
| | | | | 705/53 |
| 2012/0284175 | A1* | 11/2012 | Wilson | G06Q 20/10 |
| | | | | 705/39 |
| 2013/0246279 | A1* | 9/2013 | Everett | G06Q 20/02 |
| | | | | 705/64 |
| 2017/0364552 | A1* | 12/2017 | Pattanaik | G06F 16/2365 |
| 2018/0109508 | A1 | 4/2018 | Wall | |
| 2020/0065814 | A1 | 2/2020 | Fang | |
| 2020/0349559 | A1 | 11/2020 | Setia | |
| 2022/0343321 | A1* | 10/2022 | Setia | G06Q 20/367 |

OTHER PUBLICATIONS

Office Action (Notice of Allowance and Fees Due (PTOL-85)) dated May 4, 2022 for U.S. Appl. No. 16/401,434 (pp. 1-5).
Office Action (Notice of Allowance and Fees Due (PTOL-85)) dated May 19, 2022 for U.S. Appl. No. 16/401,434 (pp. 1-4).
Office Action dated Feb. 26, 2021 for U.S. Appl. No. 16/401,434 (pp. 1-9).
Office Action dated Jul. 15, 2021 for U.S. Appl. No. 16/401,434 (pp. 1-10).

* cited by examiner

MASKING A PRIMARY ACCOUNT NUMBER BETWEEN A PARTY AND A SERVICE PROVIDER

CROSS-REFERENCE TO RELATED APPLICATIONS

This application is a continuation application of U.S. application Ser. No. 16/401,434 filed on May 2, 2019, entitled "MASKING A PRIMARY ACCOUNT NUMBER BETWEEN A PARTY AND A SERVICE PROVIDER", the entire contents of which are hereby incorporated by reference.

TECHNICAL FIELD

Embodiments of the invention generally relate to enabling a third party to securely transfer, exchange, or transmit primary account number.

BACKGROUND

Payment data processing systems and services include dedicated security measures to ensure payment information or data received from merchants and consumers are secured. Third parties, such as banks, sometimes may wish to partner with the payment processing services to identify payment activities of its customers, especially those customers who are credit or debit card customers.

Unlike the banks, payment processing services typically are not subjected to regulations or laws specifically directed to banks or lending institutions. Therefore, banks, when cooperating with the payment processing services, not only need to ensure the privacy of its customers but also need to provide identifying information to the payment processing services to correlate to its customers using the payment processing services.

Embodiments of the invention attempt to solve or address one or more technical problems identified.

SUMMARY

Embodiments of the invention generate a scheme to receive masked primary account number (PAN) from a third party at a payment processing service provider and use the received masked PAN to compare to the hashed PAN to obtain the relevant information. In one embodiment, a software application add-in or plugin may be provided to perform the masking operation on a file within the environment of the third party so that when the payment processing service provider receives the file, the bank is confident that the original PAN has not been compromised or disclosed.

BRIEF DESCRIPTION OF THE DRAWINGS

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
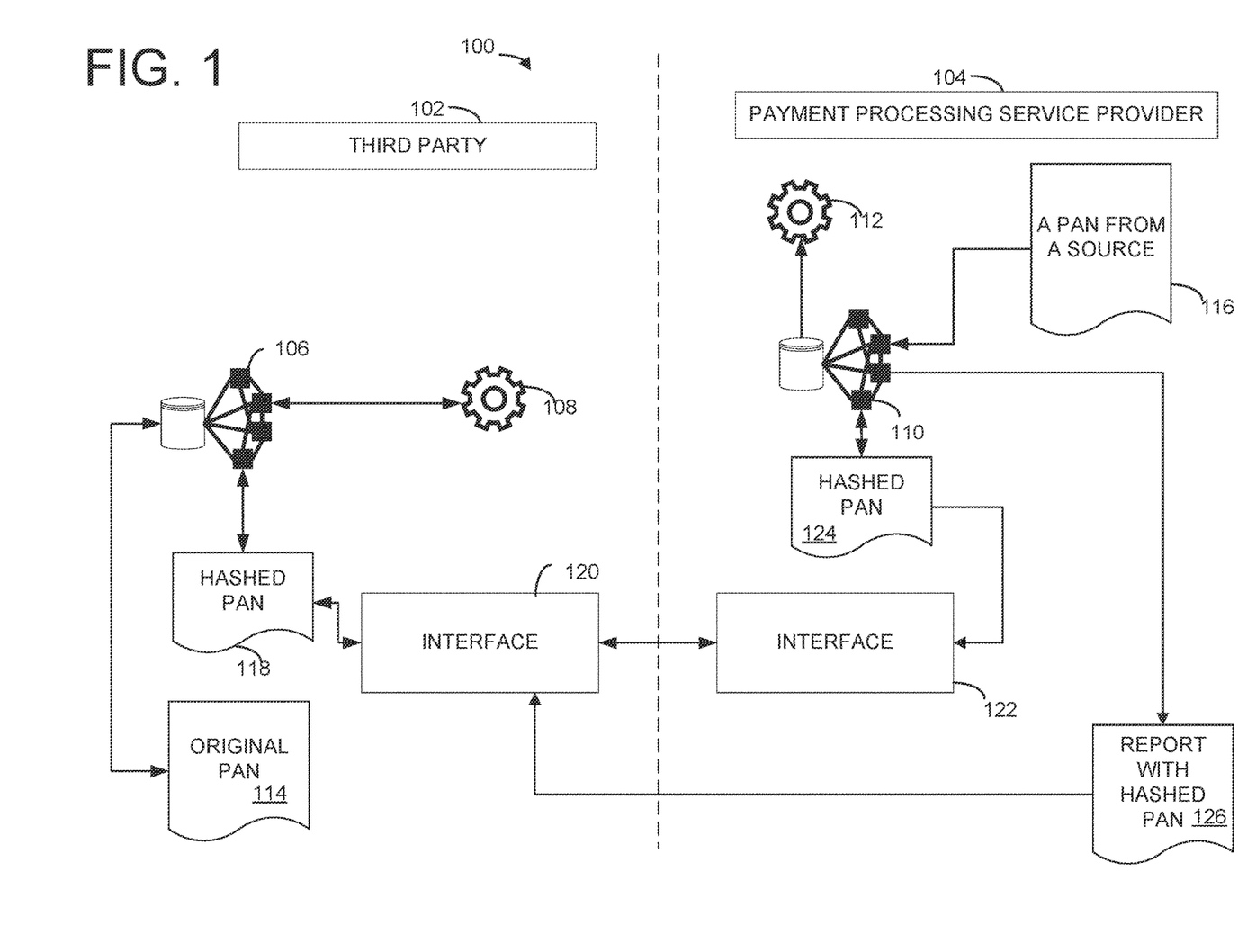
FIG. 1 is a diagram illustrates a system for masking a primary account number between a party and a service provider according to one embodiment of the invention.

Referring now to FIG. 1, a diagram illustrates a system 100 for masking a primary account number between a third party 102 and a service provider 104. In one example, the third party 102 may be a banking institution or a financial institution that may issue payment devices. In another embodiment, the service provider 104 may be a payment processing service provider that also may provide processing networks, define processing protocols, configure encryption for the data being processed, manage merchants accounts, perform analysis of purchase data, etc.

In one embodiment, the third party 102 may include a server 106 for handling services provided by the third party 102. For example, the server 106 may include a frontend server, a backend server, a database, etc. In another embodiment, the server 106 may be one or more servers distributed across multiple physical locations and may be connected by computer networks.

The server 106 may also be coupled to a configuration portal 108 to be managed by administrators. Similarly, the service provider 104 may include a server 110 and a configuration portal 112. The server 110 may include additional hardware and software for analysis and encryption. For example, the server 110 may generate digital tokens for transactions handled by the server 110.

In one aspect of the invention, the third party 106 may wish to obtain the services from the service provider 104 but does not wish to share the original PAN with the service provider 104 for security, privacy, or other regulatory reasons. As such, aspects of the invention accommodate to this specific limitation from the third party 106, the service provider 104 may first configure to ensure that the third party 106 applies a similar or identical encryption algorithms as the service provider. For example, due to its platform agnostic property, secure hash algorithm 2 (SHA-2) may be used as a set of cryptographic hash functions to encrypt the original PAN 114 from the third party 102. Similarly, as the service provider 104 may apply the same cryptographic functions to transactions with the PAN from a source, aspects of the invention facilitate the comparison at the request from the third party 102. For example, the service provider 104 may receive a PAN 116 from a merchant when a user tenders a payment device at the merchant's point-of-sale (POS) device. The service provider 104 may or may not know the original PAN before the application of the cryptographic functions.

As such, the configuration portal 108 may configure the cryptographic functions to be used so that when the server 106 applies the functions to the original PAN 114, the server 106 may generate a hashed PAN 118. With the hashed PAN 118, any other parties who do not know the cryptographic functions and/or the original PAN 114 would not be able to, with efficiency and time needed, obtain the original PAN 114. The server 106 may then transmit the hashed PAN 114 to an interface 120 of the third party 102, which may transmit the same hashed PAN 114 to an interface 122 of the service provider 104.

In another aspect, as the service provider 104 may also produce a hashed PAN 124 from the PAN 116 as part of the processing of transactions that the service provider 104 performs, the service provider 104 stores the hashed PAN 124 for various purposes. Of course, the service provider 104 has no way to obtain or acquire the actual PAN 116 as it was given the number from a source. As such, when the service provider 104 receives the hashed PAN 118 from the third party 102, the service provider 104 may not know the PAN or whether the hashed PAN 124 relates to the original PAN 114.

Embodiments of the invention provide such configurations to the third party 102 that the service provider 104 may, after receiving the hashed PAN 118, compare that with the hashed PAN 124 to determine whether there is a match. If there is a match, the service provider 104 may use its configuration portal 112 to call the server 110 to produce a report 126 to be provided to the third party 102.

It is to be understood that the third party 102 and the service provider 104 are not the same entity so that the third party 102 and the service provider 104 or vice versa may easy access each other's servers.

Figure 2:
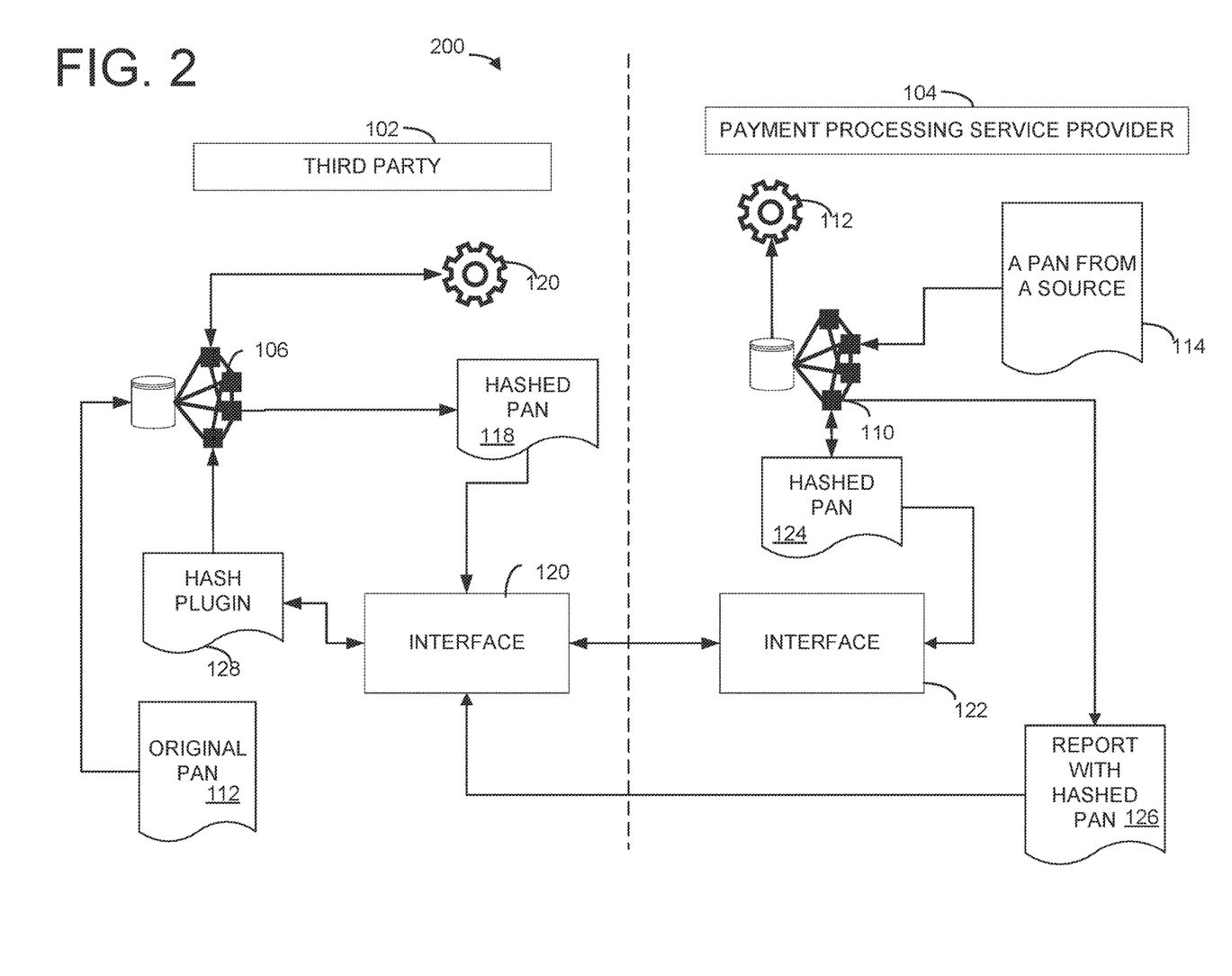
FIG. 2 is a diagram illustrates a system 100 for masking a primary account number between a party and a service provider according to another embodiment of the invention.

In another embodiment, instead of the server 102 identifying and coordinating with the service provider 104 to find identical cryptographic functions, as depicted in FIG. 2, a system 200 may include the service provider 104 to transmit a document with a hash plugin 128 to the third party 102 such that the server 106 may, after the original PAN 112 is entered into the document, execute the hash plugin 128 to generate the hashed PAN 118. With such approach, the third party 102 no longer needs to monitor or track the development of the cryptographic functions and updating the functions. Instead, the service provider 104 may periodically update the third party 102 with the updates or changes so that the functions are always in-sync and updated with the service provider 104's functions. Embodiments of the invention ensure security of creation of the hashed PAN 118 through this approach while providing convenience to the third party 102.

Upon receiving the report 126, the third party 102 may apply the cryptographic functions to convert back to the original PAN 112 if needed, but such operation may not be necessary due to the already converted or readily available original PAN 112 and their corresponding hashed PAN 118 in the possession of the third party 102.

Figure 3:
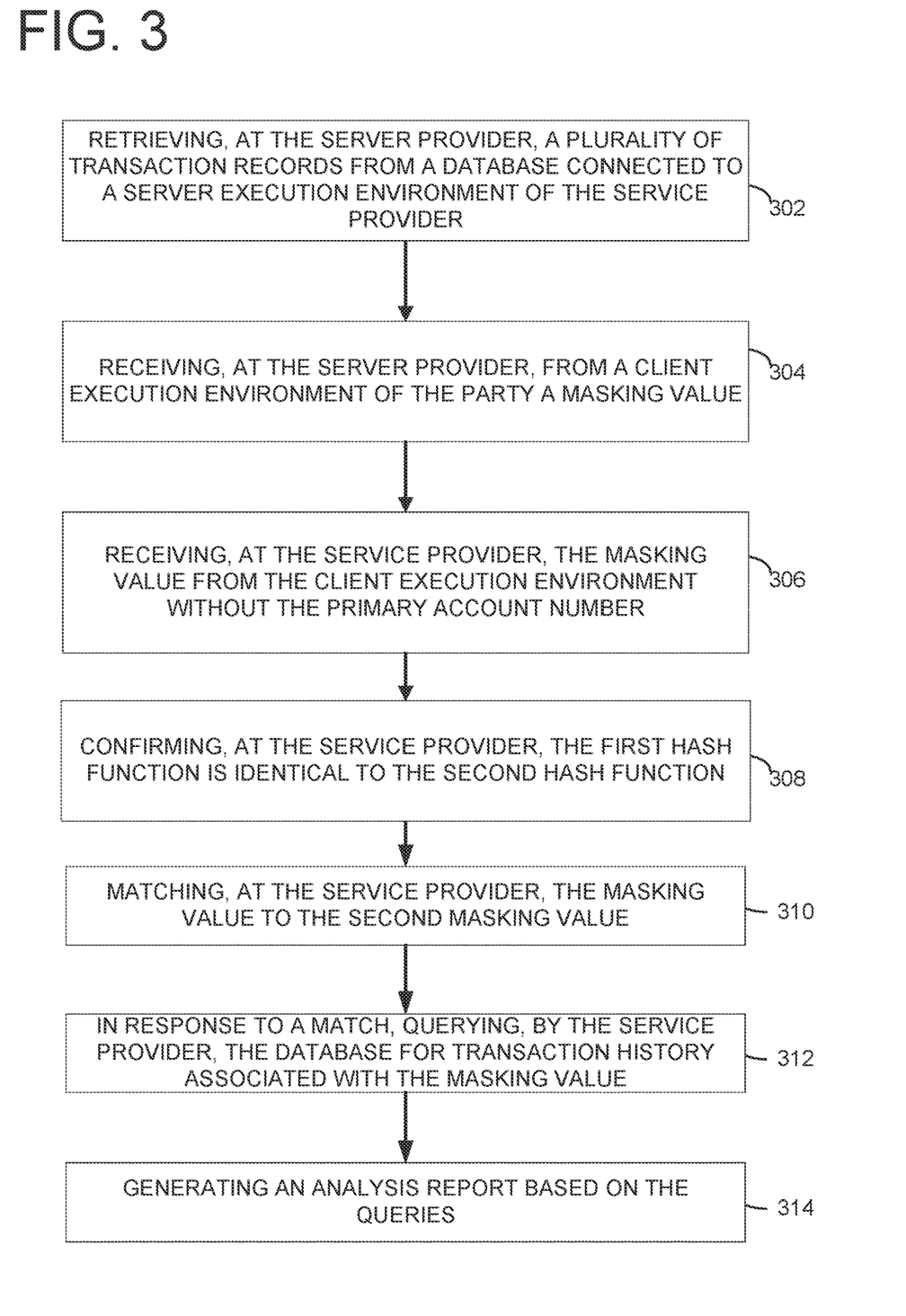
FIG. 3 is a flowchart illustrating a computer implemented method according to one embodiment of the invention.

Referring now to FIG. 3, a flow chart illustrating a computer-implemented method for masking the PAN according to one embodiment of the invention. For example, at 302, a service provider (e.g., the service provider 104) may retrieve a plurality of transaction records from a database connected to a server execution environment of the service provider. In one aspect, each of the plurality of transaction records including a second masking value generated by a second hash function executed in the server execution environment.

At 304, the service provider receives from a client execution environment of a third party (e.g., the third party 102) a masking value. In one embodiment, the client execution environment generates the masking value, in response to executing the first hash function, for a primary account number. The primary account number may be affiliated with the third party. In another embodiment, the client execution environment may call a specific function using an API to generate the masking value.

At 306, the service provider receives the masking value from the client execution environment without the primary account number. In one aspect, the server execution environment lacks identification of the affiliation between the primary account number and the third party which may help with security and privacy concerns.

At 308, the service provider confirms the first hash function is identical to the second hash function. The service provider may further match the masking value to the second masking value at 310. If the hash functions do not match, an alert may be communicated as fraud may be occurring or a mistake may be made.

At 312, the service provider queries a database for transaction history associated with the masking value. In other embodiments, the query may be directed to a memory that stores the transaction history associated with the masking value. In some embodiments, an API may be used to deliver the transaction history associated with the masking value.

At 314, the service provider may generate an analysis report based on the queries to be sent to the party. The analysis report may have a variety of information that may be relevant. In some embodiments, the party may be able to adjust the material included in the analysis report. In other embodiments, a default analysis report may be available and other reports may be selected.

In one embodiment, the masking value or the second masking value comprises a set of 64-digit alphanumeric values. Of course, the masking values or second masking value may have more or less alphanumeric values depending on the security desired, bandwidth constraints, etc.

In a further embodiment, the service provider 104 may confirm whether the cryptographic functions of the third party are identical to that of the service provider. If such confirmation fails, the service provider 104 may identify a substitution function of the second hash function for execution in the client execution environment. The service provider 104 may transmit the substitution function to the client execution environment and receive a new masking value generated by the substitution hash function from the third party.

Figure 4:
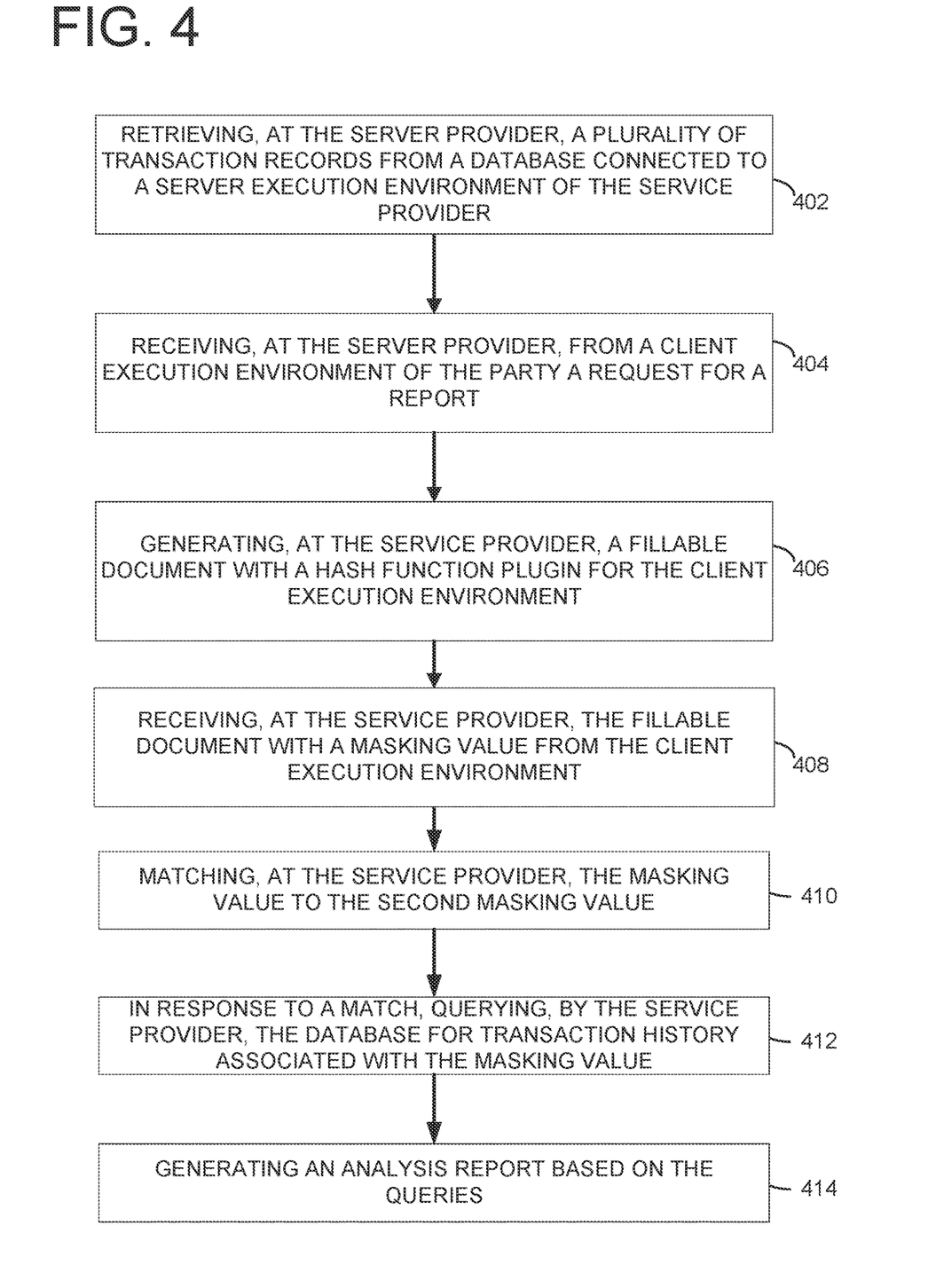
FIG. 4 is a flowchart illustrating a computer implemented method according to another embodiment of the invention.

Referring now to FIG. 4, a flow chart illustrating a computer-implemented method for masking the PAN according to another embodiment of the invention. For example, at 402, a service provider (e.g., the service provider 104) may retrieve a plurality of transaction records from a database connected to a server execution environment of the service provider. In one aspect, each of the plurality of transaction records including a second masking value generated by a second hash function executed in the server execution environment.

At 404, the service provider receives from a client execution environment of a third party (e.g., the third party 102) a request for a report on a subset of the plurality of transaction records. The subset may be requested using a user interface or may be requested by another computing function which may design the request for the necessary information.

In one embodiment, the service provider may generate a fillable document with a hash function plugin for the client execution environment at 406. The hash function may be securely stored to assist in keeping the process secure and maintaining privacy.

At 408, the service provider receives the fillable document with a masking value from the client execution environment without the primary account number. In one aspect, the server execution environment lacks identification of the affiliation between the primary account number and the third party.

The service provider may further match the masking value to the second masking value at 410. As mentioned previously, if the masking value and second masking value do not match, an alarm may be communicated as fraud may be occurring or unwanted intruders may be using the system.

At 412, the service provider queries a database for transaction history associated with the masking value. As mentioned previously, the transaction history associated with the masking value may be acquired using an API to call a function to return the desired values.

At 414, the service provider may generate an analysis report based on the queries to be sent to the party. The analysis report may have a variety of information that may be relevant. In some embodiments, the party may be able to adjust the material included in the analysis report. In other embodiments, a default analysis report may be available and other reports may be selected.

In another embodiment, aspects of the invention may be implemented with a client execution environment (e.g., at a third party) and a server execution environment (e.g., at a service provider). For example, a client execution environment of the party may include a first hash function, and the client execution environment generates a masking value in response to executing the first hash function from a primary account number (PAN). The PAN may be created by the third party. In one embodiment, the client execution environment may call a specific function using an API to generate the masking value. A server execution environment of the service provider may be connected to a database where a plurality of transaction records are stored. Each of the plurality of transaction records may include a second masking value generated by a second hash function executed in the server execution environment. In one embodiment, the server execution environment may call a function using an API to generate the masking value. In another example, the second masking value may be generated as part of the tokenization or encryption of a purchase transaction.

In one instance, the server execution environment receives the masking value from the client execution environment without the primary account number, and that the server execution environment lacks identification of the affiliation between the PAN and the third party which may help with security and privacy concerns. In a further embodiment, the server execution environment confirms that the first hash function is identical to the second hash function and then compares the masking value with the second masking value. If the hash functions do not match, an alert may be communicated as fraud may be occurring or a mistake may be made. In response to a match, the server execution environment queries the database for transaction history of associated with the masking value. In other embodiments, the query may be directed to a memory that stores the transaction history associated with the masking value. In some embodiments, an API may be used to deliver the transaction history associated with the masking value.

In another embodiment, the server execution environment generates an analysis report based on the queries. The analysis report may have a variety of information that may be relevant. In some embodiments, the party may be able to adjust the material included in the analysis report. In other embodiments, a default analysis report may be available and other reports may be selected.

Figure 5:
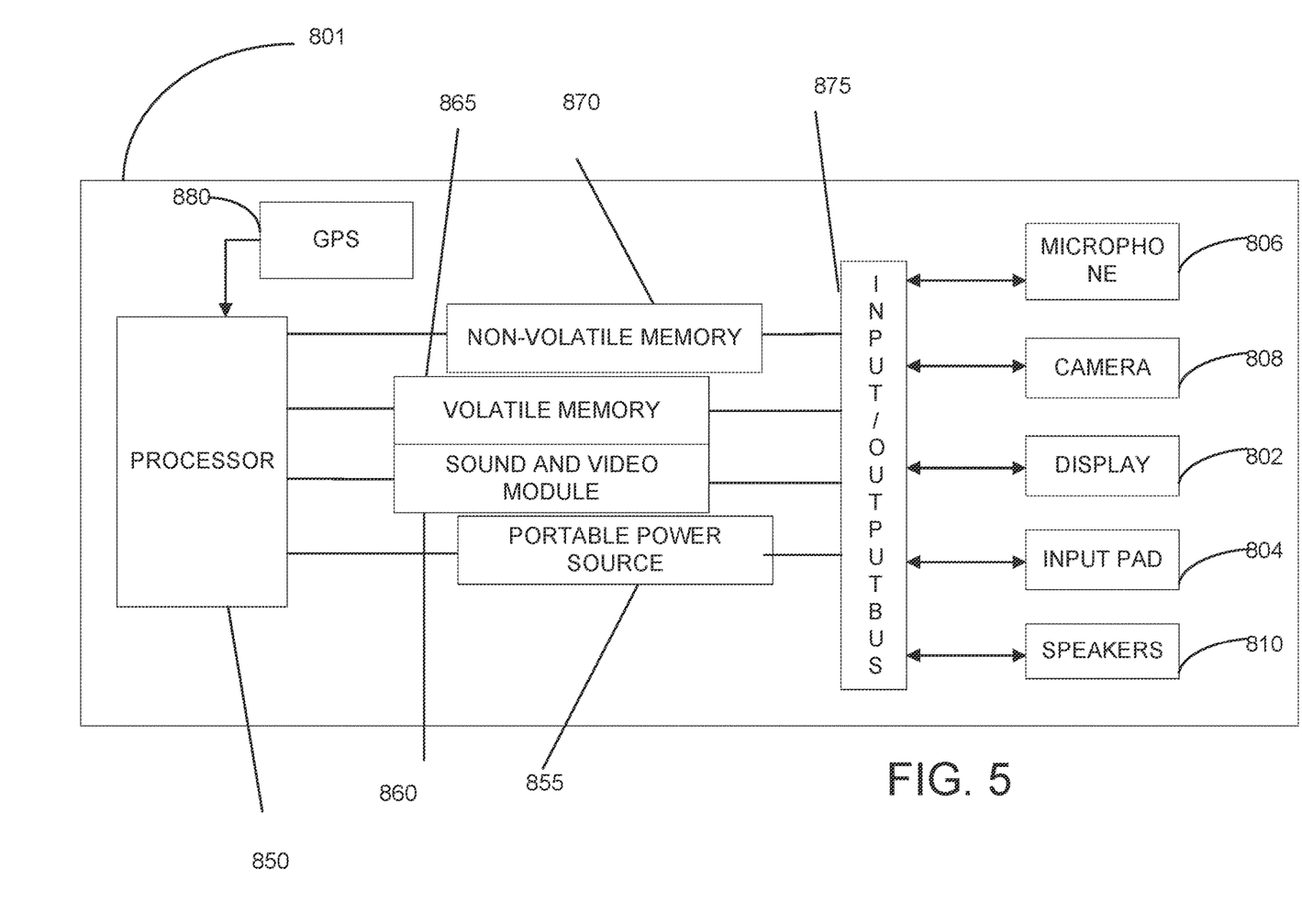
FIG. 5 is a diagram illustrating a portable computing device according to one embodiment of the invention.

FIG. 5 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 5 may be a simplified illustration of the physical elements that make up a portable computing device 801 and FIG. 6 may be a simplified illustration of the physical elements that make up a server type computing device 841.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 6:
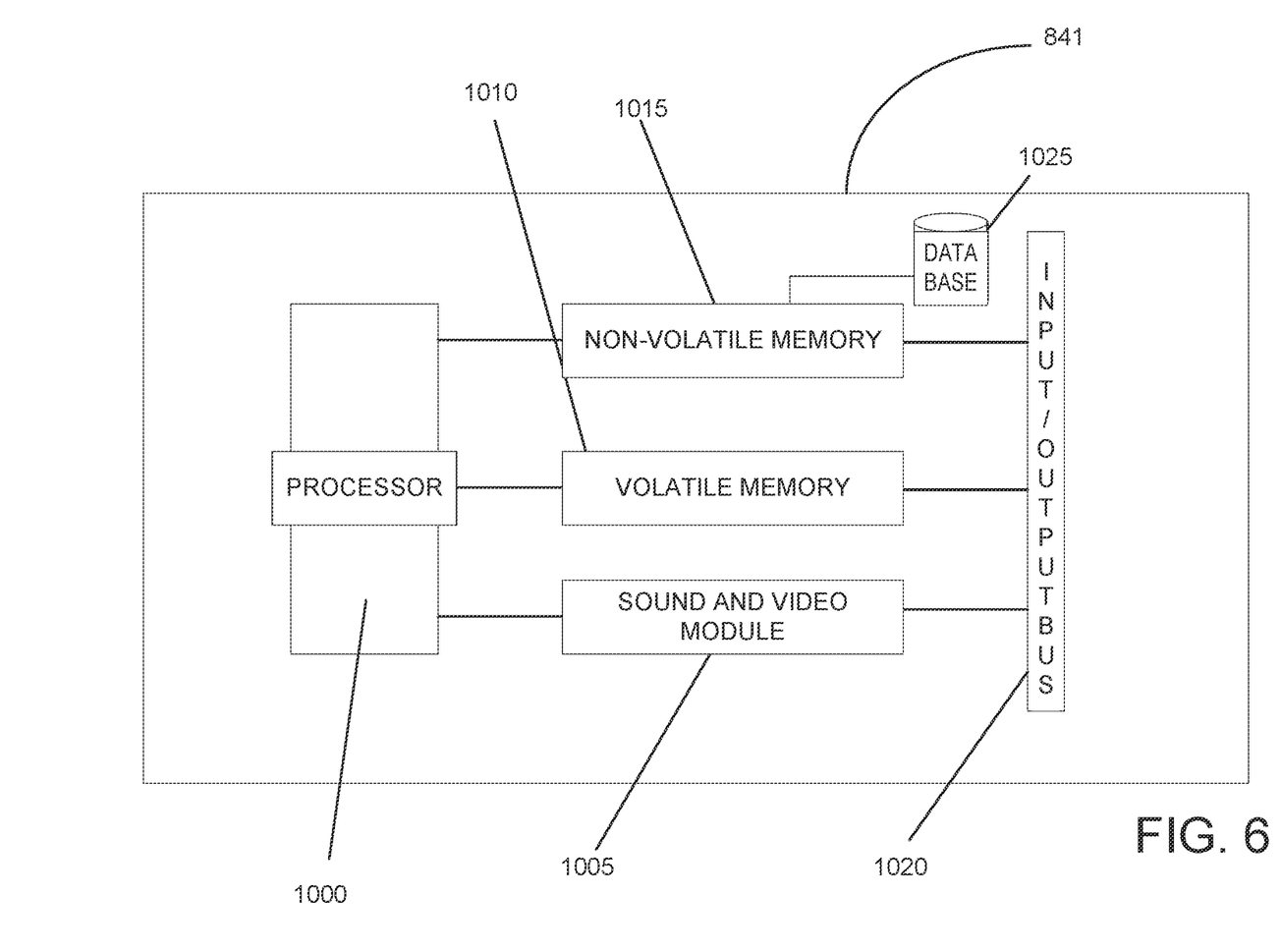
FIG. 6 is a diagram illustrating a remote computing device according to one embodiment of the invention.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel Corporation, AMD, ARM, Qualcomm, or MediaTek); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, iOS, Android, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server (s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving verification card information when exchanging between a payment processor and a bank who needs to comply with more stringent national and local banking regulations. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computer implemented method for masking a primary account number between a party and a service provider comprising:
    retrieving, at the service provider, a plurality of transaction records from a database connected to a server execution environment of the service provider via an application programming interface (API), wherein each of the plurality of transaction records comprises a second masking value generated by a second hash function executed in the server execution environment;
    generating, at the service provider, a fillable document comprising a hash plugin of a first hash function, wherein the first hash function is updated to be the same as the second hash function;
    transmitting, at the service provider, the fillable document comprising the hash plugin of the first hash function to a client execution environment of the party;
    receiving, at the service provider, the fillable document comprising a first masking value from the client execution environment of the party, wherein the client execution environment generates the first masking value for a primary account number in response to executing the first hash function;
    querying, by the service provider, the database for transaction history associated with the first masking value, based on a comparison that the first masking value and the second masking value match; and
    transmitting, via the server execution environment of the service provider, each of the plurality of transaction records comprising the second masking value that matches the first masking value based on the query of the database.

2. The computer implemented method of claim 1, wherein the first masking value comprises a set of 64-digit alphanumeric values.

3. The computer implemented method of claim 1, wherein the analysis report is requested via a user interface that is in communication with the client execution environment.

4. The computer implemented method of claim 1, wherein the fillable document is generated in response to input received from a user interface.

5. The computer implemented method of claim 1, wherein the transaction history is a subset of the plurality of transaction records.

6. The computer implemented method of claim 1, further comprising:
    in response to a determination that the first masking value and the second masking value do not match, communicating an alarm.

7. The computer implemented method of claim 1, wherein the party and the service provider are different entities.

8. The computer implemented method of claim 1, wherein the service provider is a payment processing service provider.

9. The computer implemented method of claim 1, wherein the API delivers the transaction history associated with the first masking value.

10. A system for masking a primary account number between a party and a service provider comprising:
    a database connected to a server execution environment; and
    a processor of the server execution environment that is in communication with the database, the processor being physically configured according to computer executable instructions to:
        retrieve a plurality of transaction records from the database via an application programming interface (API), wherein each of the plurality of transaction records comprises a second masking value generated by a second hash function executed in the server execution environment;
        generate a fillable document comprising a hash plugin of a first hash function, wherein the first hash function is updated to be the same as the second hash function;
        transmit the fillable document comprising the hash plugin of the first hash function to a client execution environment of the party;
        receive the fillable document comprising a first masking value from the client execution environment of the party, wherein the client execution environment generates the first masking value for a primary account number in response to executing the first hash function;

query the database for transaction history associated with the first masking value, based on a comparison that the first masking value and the second masking value match; and transmit each of the plurality of transaction records comprising the second masking value that matches the first masking value based on the query of the database.

\* \* \* \* \*